United States Patent Office 3,214,422
Patented Oct. 26, 1965

3,214,422
CROSSLINKING POLYETHYLENE
Orville L. Mageli, Grand Island, and James B. Harrison, Eggertsville, N.Y., assignors to Wallace & Tiernan Incorporated, Newark, N.J.
No Drawing. Filed Aug. 28, 1959, Ser. No. 836,599
13 Claims. (Cl. 260—94.9)

The present invention relates to polyalkenyl compositions capable of being crosslinked, and to a method for crosslinking such materials particularly the polyethylenes.

Heretofore it has been proposed to crosslink polyethylene compositions by the employment of (a) energy bombardment of the polyethylene or by (b) the employment of certain specified peroxy compounds, as for instance special organic hydroperoxides or peroxides.

It was felt that in the employment of the organic percompounds, curing by crosslinking was induced by the production in the reaction environment of free radicals which induced crosslinking by a so-called free radical mechanism.

The desirability of producing crosslinking in polymers which are polyethylene compositions, and related polyalkenyl materials, resides in inducing change in certain of the physical and chemical characteristics of the polymer whereby the solubility of the polymer in solvents is decreased, the thermoplasticity of the polymer suitably reduced and resistance of the polymer to deformation increased. By inducing such changes, the field of use of the polymer is broadened and the characteristics of products formed from the polymer, whether these characteristics be physical or chemical, are enhanced.

In accordance with the broad aspects of the present invention, an acetylenic organic polyfunctional peroxy compound of relatively large molecular weight is added to the polyethylene composition and crosslinking effected by heating the mixed composition.

It is believed that linear polyalkenyl compositions are effectively crosslinked, in accordance with the present invention, by reason of the fact that the decrease in solubility of the linear polyethylene is substantially directly proportional to the amount of the polyperoxy compound thermally united therewith.

In order to obtain test results showing the relative order of the effectiveness of crosslinking, weighed samples of commercial polyethylene compositions were heated in a chosen solvent in the presence of a specified weight percent of a diperoxy compound, such specified weight percent generally being from about 1% to 10% by weight, based upon the weight of the polyethylene composition, and the mixture heated under specified conditions. The amount of end product insoluble in the solvent was then determined, from which data the degree of crosslinking could be calculated. This is a standard test and is described in J. Polymer Sci., 31, 127 (1958).

The modified test to determine crosslinking, as employed herein, consisted in dissolving, under heating, 10 parts by weight of the polyethylene composition in 35 parts by weight of xylene. When the polyethylene was dissolved in the xylene, the mixture was cooled to about 90° C., the weighed amount of the crosslinking agent, a high molecular weight polyperoxy compound then added and the mixture heated upon a hot-plate for about 20 minutes until a gel was produced.

The gel was recovered and cut into small pieces which were then refluxed with a measured amount (200 ml.) of xylene, for approximately one hour. The refluxed insoluble residue was then collected and freed of xylene by a slow-moving current of air at room temperature and weighed. By this quick test for the percent of crosslinking, the relative order of the effectiveness of any crosslinking agent can be obtained, such percent being obtained by dividing the weight of the dried, insoluble refluxed residue by 10 and multiplying by 100.

Some of the acetylenic polyperoxy compounds found to be suitable for crosslinking linear polyethylene polymers are 2,5-dimethyl-2,5-di(peroxy ethyl carbonate) hexyne-3; 2,5-dimethyl-2,5-di(t-butylperoxy)hexyne-3; 3,6-dimethyl-3,6-di(t-butylperoxy)octyne-4; 1,4-tetraphenyl-1,4-(t-butylperoxy)butyne-2.

It would appear that these high molecular weight polyperoxy compounds comprise a class of polyfunctional, specifically difunctional, diperoxy compounds possessing at least two peroxy radicals connected in the same molecule. It will be noted that in these compounds the carbon bearing the functional peroxy groups of hydroperoxy groups are separated in the molecule from another carbon bearing a functional peroxy or hydroperoxy group by not more than four carbon atoms.

The polyethylenes, whether of the so-called high pressure-low density type, or low pressure-high density type, are extremely versatile polymeric materials and suitable for many uses by reason of ability to be formed into films and filaments. Additionally, polyethylene may be fabricated by standard procedures and may have included therein many forms of filling materials, some of which are of inorganic origin, as for instance silica, whiting, alumina, and the like, while others may be the standard carbon black.

In the crosslinking of polyethylene, in accordance with the present invention, the polyethylene composition is admixed with the crosslinking agent of the present invention which may be done by employing conventional techniques employed in the elastomer field, as for instance passage through milling rolls or dispersion using conventional type of mixers.

Such admixture of the crosslinking agent with the polyethylene composition may be performed at room temperature or at temperatures somewhat removed from room temperature, but below that at which crosslinking is effected and the polyethylene composition cured, unless the curing and admixture are relatively simultaneous.

The crosslinking agents of the present invention possessing a relatively favorable half-life, the admixing can be performed at moderately elevated temperatures with the advantages attendant upon this type of procedure. After uniform distribution of the crosslinking agent in the polymer, the admixture can then be formed and shaped by conventional procedures, such as formation into films and filaments, or molding in conventional ways, as by extrusion or by injection molding, or other manipulations demanded by the type and kind of end product desired.

The polyethylene composition may be polyethylene itself or polyethylene containing additives and fillers. The material contemplated herein under the term polyethylene is described in Modern Plastics Encyclopedia, and is also described in Patent 2,153,553, Fawcett et al., April 11, 1939. It has also been suggested to cure these polymer materials by the employment of peroxides, as for instance di(aralkyl) peroxides, particular species being di-alpha cumyl peroxide and t-butyl alpha cumyl peroxide. These peroxides are all monofunctional in contrast to the poly peroxy functional of the crosslinking agents of the present invention.

In the tabulation appended below there is listed the crosslinking action of selected representative members of the polyfunctional peroxides of the present invention. The tabulation describes the quantity of xylene insoluble product produced and which is representative of the degree of crosslinking generated by the particular polyfunctional peroxide.

Polyethylenes of various molecular weights are available on the market, and the types of these polymers are described by Lawton et al. in Industrial and Engineering Chemistry, 46, 1703–1709. Various companies offer commercial polyethylenes and for the purposes of the tests described herein, polyethylene compositions, as sold by E. I. du Pont de Nemours, Inc., Wilmington, Delaware, under the designation Alathon 1, 3, 10, 12, 14, etc., were employed, specifically Alathon 10 and Alathon 3. Since carbon black occurs on the market in various stages of acidity; that is, acid, neutral and alkaline types, a few examples of crosslinking in the presence of carbon black, as filler, are also appended. It will be noted from the table that the polyfunctional relatively high molecular peroxy compounds all induce crosslinking in accordance with the testing procedure outlined herein. When actually milled with polyethylene compositions, formed and cured end products result which possess an increased resistance to deformation under heat, decreased solubility, and increased tensile strength, all desirable characteristics tending to increase the field of use of these versatile polymers.

*Table 1*

POLYETHYLENE CROSSLINKING AT 5% CONCENTRATION

| Peroxide Tested | Percent Crosslinked Material Insoluble in Xylene | |
|---|---|---|
| | Alathon-10 | Alathon-3 |
| 2,7-Dimethyl-2,7-di(t-butylperoxy)octadiyne-3,5 | 38 | 46 |
| 2,5-Dimethyl-2,5-di(peroxybenzoate)hexyne-3 | 57 | 41 |
| 2,5-Dimethyl-2,5-di(peroxy-n-propyl carbonate)hexyne-3 | 53 | 55 |
| 2,5-Dimethyl-2,5-di(peroxy isobutyl carbonate)hexyne-3 | 52 | 39 |
| 2,5-Dimethyl-2,5-di(peroxy ethyl carbonate)hexyne-3 | 36 | 33 |
| 2,5-Dimethyl-2,5-di(alpha-cumyl peroxy)hexyne-3 | 25 | 40 |
| 2,7-Dimethyl-2,7-di(peroxy ethyl carbonate)octadiyne-3,5 | 19 | |

The amount of crosslinking is substantially directly proportional to the amount of the polyperoxy crosslinking agent incorporated in and heated with the polyethylene with a maximum at about 10%.

The peroxide heretofore recommended as most efficient for the crosslinking of polyethylene compositions comprised the monoperoxide dicumyl peroxide. There is included in Table 2 the results of comparative crosslinking efficiency of the polyperoxide outlined herein, with reference to dicumyl peroxide at the 5% level.

*Table 2*

ALATHON-10 POLYETHYLENE-XYLENE SOLVENT

| Peroxide Molecular Weight | Peroxide Name | Percent Material Cross-Linked |
|---|---|---|
| 270 | Dicumyl (Dicup) | 61 |
| 386 | 2,5-Dimethyl-2,5-di(peroxy beta-chloroethyl carbonate)hexyne-3 | 67 |
| 398 | Acetylene-1,1'-di(cyclohexyl-1-peroxy ethyl carbonate) | 65 |
| 286 | 2.5-Dimethyl-2,5-di(t-butylperoxy)hexyne-3 | 74 |

ALATHON-3 POLYETHYLENE-XYLENE SOLVENT

| | | |
|---|---|---|
| 270 | Dicumyl (Dicup) | 37 |
| 382 | 2,5-Dimethyl-2,5-di(peroxybenzoate)hexyne-3 | 41 |
| 346 | 2,5-Dimethyl-2,5-di(peroxy n-propyl carbonate(hexyne-3 | 55 |
| 374 | 2,5-Dimethyl-2,5-di(peroxy isobutyl carbonate)hexyne-3 | 39 |
| 310 | 2,7-Dimethyl-2,7-di(t-butylperoxy)octadiyne-3,5 | 46 |
| 431 | 3,6-Dimethyl-3,6-di(peroxy ethyl carbonate) octyne-4 | 55 |
| 314 | 3,6-Dimethyl-3,6(t-butylperoxy) octyne-4 | 41 |
| 318 | 2,5-Dimethyl-2,5-di(peroxy ethyl carbonate) hexyne-3 | 43 |

ALATHON-10 POLYETHYLENE-XYLENE SOLVENT—CARBON BLACK

| | | |
|---|---|---|
| 270 | Dicumyl (Dicup) | 62 |
| 374 | 2,5-Dimethyl-2,5-di(peroxy isobutyl carbonate) hexyne-3 | 63 |
| 382 | 2,5-Dimethyl-2,5-di(peroxybenzoate) hexyne-3 | 83 |

The organic polyperoxides of the present invention found suitable for crosslinking polyethylene, contain at least two peroxide radicals in the molecule, and when these radicals are attached to separate carbon atoms, such peroxide groups are separated by not more than four carbon atoms, i.e., carbons in positions 1 and 4. In general, the molecular weights of the polyperoxides of the present invention fall within the range 230 to 550 and comprise the diperoxy compounds of hexynes having the formula

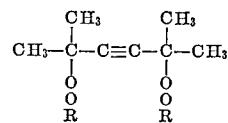

octynes having the formula

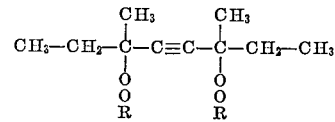

and octynes having the formula

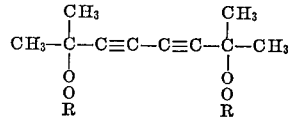

where R is selected from the group consisting of tertiary alkyl, alkyl carbonate, and benzoate.

What is claimed is:
1. The process of crosslinking polyethylene which comprises incorporating in polyethylene a crosslinking amount of an acetylenic high molecular weight diperoxy compound selected from the group consisting of hexynes and having the formula

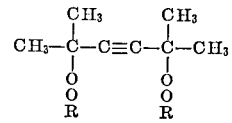

octynes having the formula

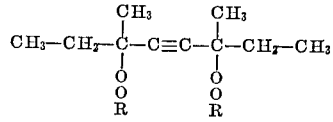

and octynes having the formula

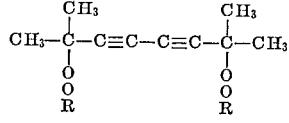

and where R is selected from the group consisting of tertiary alkyl, alkyl carbonate, and benzoate, and heating the mixture until crosslinking is effected.

2. Process of claim 1 wherein the diperoxy compound is 2,5-dimethyl-2,5-di(t-butylperoxy)hexyne-3.

3. Process of claim 1 wherein the diperoxy compound is 2,5-dimethyl-2,5-di(peroxybenzoate)hexyne-3.

4. Process of claim 1 wherein the diperoxy compound is 2,7-dimethyl-2,7-di(t-butylperoxy)octadiyne-3,5.

5. Process of claim 1 wherein the diperoxy compound is 2,5 - dimethyl - 2,5 - di(peroxy - n - propylcarbonate) hexyne-3.

6. Process of claim 1 wherein the diperoxy compound is 3,6-di(peroxyethylcarbonate)octyne-4.

7. A composition capable of being crosslinked by heating, comprising polyethylene and a crosslinking amount of an acetylenic high molecular weight diperoxy compound selected from the group consisting of hexynes having the formula

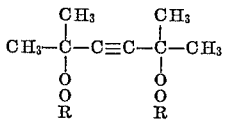

octynes having the formula

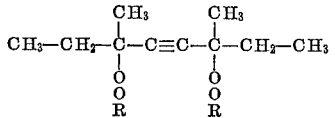

and octynes having the formula

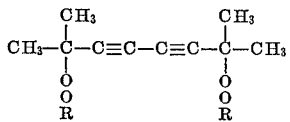

where R is selected from the group consisting of tertiary alkyl, alkyl carbonate and benzoate.

8. A composition capable of being crosslinked by heating, comprising polyethylene and a crosslinking amount of 2,5-dimethyl-2,5-di(t-butylperoxy)hexyne-3.

9. A composition capable of being crosslinked by heating, comprising polyethylene and a crosslinking amount of 2,5-dimethyl-2,5-di(peroxybenzoate)hexyne-3.

10. A composition capable of being crosslinked by heating, comprising polyethylene and a crosslinking amount of 2,7-dimethyl-2,7-di(t-butylperoxy)octadiyne-3,5.

11. A composition capable of being crosslinked by heating, comprising polyethylene and a crosslinking amount of 2,5-di(peroxy-n-propylcarbonate)hexyne-3.

12. A composition capable of being crosslinked by heating, comprising polyethylene and a crosslinking amount of 3,6 - dimethyl - 3,6 - di(peroxyethylcarbonate) octyne-4.

13. The process of crosslinking polyethylene which comprises incorporating in polyethylene a crosslinking amount of 2,5 - dimethyl-2,5 - di(t - butylperoxy)hexyne-3 and heating until crosslinking is effected.

References Cited by the Examiner

UNITED STATES PATENTS

| | | | |
|---|---|---|---|
| 2,455,569 | 12/48 | Dickey | 260—610 |
| 2,511,480 | 6/50 | Roedel | 260—94.9 |
| 2,826,570 | 3/58 | Ivett | 260—94.9 |
| 2,916,481 | 12/59 | Gilmont | 260—94.9 |

JOSEPH L. SCHOFER, *Primary Examiner.*

JULES FROME, L. H. GASTON, MORRIS LIEBMAN,
*Examiners.*